(12) United States Patent
Lo et al.

(10) Patent No.: US 6,311,600 B1
(45) Date of Patent: Nov. 6, 2001

(54) ELECTRIC POWER CABLE SHEATH CUTTER

(75) Inventors: Kok Keung Lo; Hoi Kwun (Eric) Fung; Jing Yuan, all of Hong Kong (HK)

(73) Assignee: Hong Kong Polytechnic University, Kowloon (HK)

( * ) Notice: Subject to any disclaimer, the term of this patent is extended or adjusted under 35 U.S.C. 154(b) by 0 days.

(21) Appl. No.: 09/421,394

(22) Filed: Oct. 20, 1999

(51) Int. Cl.$^7$ ........................................... H02G 1/12
(52) U.S. Cl. ..................... 83/861; 83/745; 83/947; 30/90.9
(58) Field of Search ............... 83/743, 745, 861, 83/881; 30/90.9, 90.4; 81/9.4, 9.51

(56) References Cited

U.S. PATENT DOCUMENTS

| | | | |
|---|---|---|---|
| 1,793,683 | * | 3/1931 | Korab .................................. 30/90.9 |
| 2,346,227 | * | 4/1944 | Martin et al. ........................ 30/90.7 |
| 2,388,698 | * | 11/1945 | Montgomery ...................... 30/90.7 |
| 2,442,063 | * | 5/1948 | Stone .................................. 30/90.7 |
| 2,648,899 | * | 8/1953 | Beyer .................................. 30/90.9 |
| 2,830,366 | * | 4/1958 | Chisena .............................. 30/90.7 |
| 3,988,826 | * | 11/1976 | Heikkala .............................. 30/90.4 |
| 4,543,717 | * | 10/1985 | Luka ................................... 30/90.6 |
| 4,981,054 | * | 1/1991 | Stepan ................................ 81/9.51 |
| 5,140,873 | * | 8/1992 | Schwartzman ..................... 81/9.43 |
| 5,301,426 | | 4/1994 | Regan . |
| 5,389,192 | * | 2/1995 | Takimoto et al. .................. 156/584 |
| 5,460,071 | * | 10/1995 | Barrett et al. ...................... 83/744 |
| 5,542,327 | * | 8/1996 | Schultz .............................. 83/861 |
| 5,659,935 | * | 8/1997 | Lo-Pinto et al. .................... 29/33.7 |
| 5,745,996 | * | 5/1998 | Kenny et al. ....................... 30/90.1 |
| 5,794,494 | * | 8/1998 | Long, Jr. ............................. 81/9.51 |
| 5,806,188 | * | 9/1998 | Caraballo ........................... 30/92.5 |
| 5,809,652 | * | 9/1998 | Ducret ................................ 30/90.7 |
| 5,809,849 | * | 9/1998 | Coffey et al. ...................... 81/9.51 |
| 5,950,505 | * | 9/1999 | Locher ............................... 81/9.51 |
| 5,974,932 | * | 11/1999 | Suzuki et al. ...................... 83/745 |
| 5,979,286 | * | 11/1999 | Burth ................................. 83/861 |
| 5,988,018 | * | 11/1999 | Tolbert et al. ...................... 81/9.4 |
| 6,079,105 | * | 6/2000 | Hollingsworth ................... 30/90.4 |
| 6,088,900 | * | 7/2000 | Finzel et al. ....................... 29/426.4 |

FOREIGN PATENT DOCUMENTS

| | | |
|---|---|---|
| 0121680 | 2/1984 | (EP) . |
| 627237 | 11/1946 | (GB) . |
| 792605 | 12/1955 | (GB) . |
| 1458366 | 12/1976 | (GB) . |
| 2133637 | 7/1983 | (GB) . |
| 2239133 | 6/1991 | (GB) . |
| 2257571 | 1/1993 | (GB) . |

* cited by examiner

*Primary Examiner*—Rinaldi I. Rada
*Assistant Examiner*—Kim Ngoc Tran
(74) *Attorney, Agent, or Firm*—Leydig, Voit & Mayer, Ltd

(57) ABSTRACT

An electric power cable sheath cutter for longitudinally slicing an outer metallic sheath of a power cable include a frame arranged to be clamped by clamps to each end of a selected longitudinal section of the power cable. A carriage, slidingly mounted to the frame, has rollers that embrace an outer surface of the power cable so that the carriage "floats" on the cable in use. A milling tool with its drive motor is supported on the carriage and is adjustable up and down to enable a depth to be chosen. As a result, the sheath is cut through and inner strands of the power cable are not damaged. The effective depth of the remote end of the cutting tool is controlled by operation of a first motor 20, and the carriage is driven along in use the frame by a second motor so that the cutter can operate automatically without close manual supervision.

7 Claims, 3 Drawing Sheets

ELECTRIC POWER CABLE SHEATH CUTTER

BACKGROUND OF THE INVENTION

1. Field of the Invention

The invention relates to an electric power cable sheath cutter.

2. Description of Prior Art

Power cables are conventionally formed with insulated inner strands surrounded by a metallic sheath which is usually corrugated. In order to terminate, to test, to join and to repair such cables, the outer sheath must be stripped away so that lengths of the inner strands can be exposed, inspected, separated and worked on as required. At present, the stripping is carried out by longitudinally slicing the sheath using a hand chisel and hammer and then peeling back the sheath. This is labor intensive, and also dangerous if the cable is carrying power. There is also a real possibility of damaging the insulation material of the inner strands during slicing even by skilled personnel.

SUMMARY OF THE INVENTION

It is an object of the invention to overcome or at least reduce these problems.

According to the invention there is provided an electric power cable sheath cutter for longitudinally slicing an outer metallic sheath of the power cable having a longitudinal axis, the cutter comprising a frame having two ends each with a clamp that fits to a respective end of a longitudinal section of the cable, a carriage slidingly mounted to the frame arranged to travel longitudinally between the ends of the frame and at least on roller arranged to ride on the section of the cable and to support the carriage in fixed lateral disposition relative to the cable, a cutting tool mounted to the carriage that can be adjusted laterally towards and away from the longitudinal axis of the cable and set to cut a predetermined depth into an outer surface of the cable as the carriage travels from one end of the section to the other.

The at least one roller has a concave periphery against which an outer surface of the cable bears in use. Preferably, there are three rollers evenly distributed around longitudinal axis of the cable, one of which is positioned directly opposite the cutting tool.

The cutter may include an electric motor mounted to the carriage above and connected to drive the cutting tool. The cutting tool may be a milling drill.

An electric motor may be mounted to the carriage and arranged to move the carriage between the ends of the section to enable the slicing to progress automatically.

One or more screwed feeding shafts may be arranged extending between and supported by each end of the frame, together with an endless drive connected between the motor and the shaft and a screwed follower fixed to the carriage that is coupled to the feeding shaft, so that the carriage is moved between the ends of the frame when the motor is operated.

The electric motors are preferably low voltage direct current motors arranged to be supplied from a common portable electrical power supply.

BRIEF DESCRIPTION OF THE DRAWING

Electric power cable cutters according to the invention will now be described by way of example with reference to the accompanying drawings in which.

DESCRIPTION OF THE PREFERRED EMBODIMENTS

Figure 1:
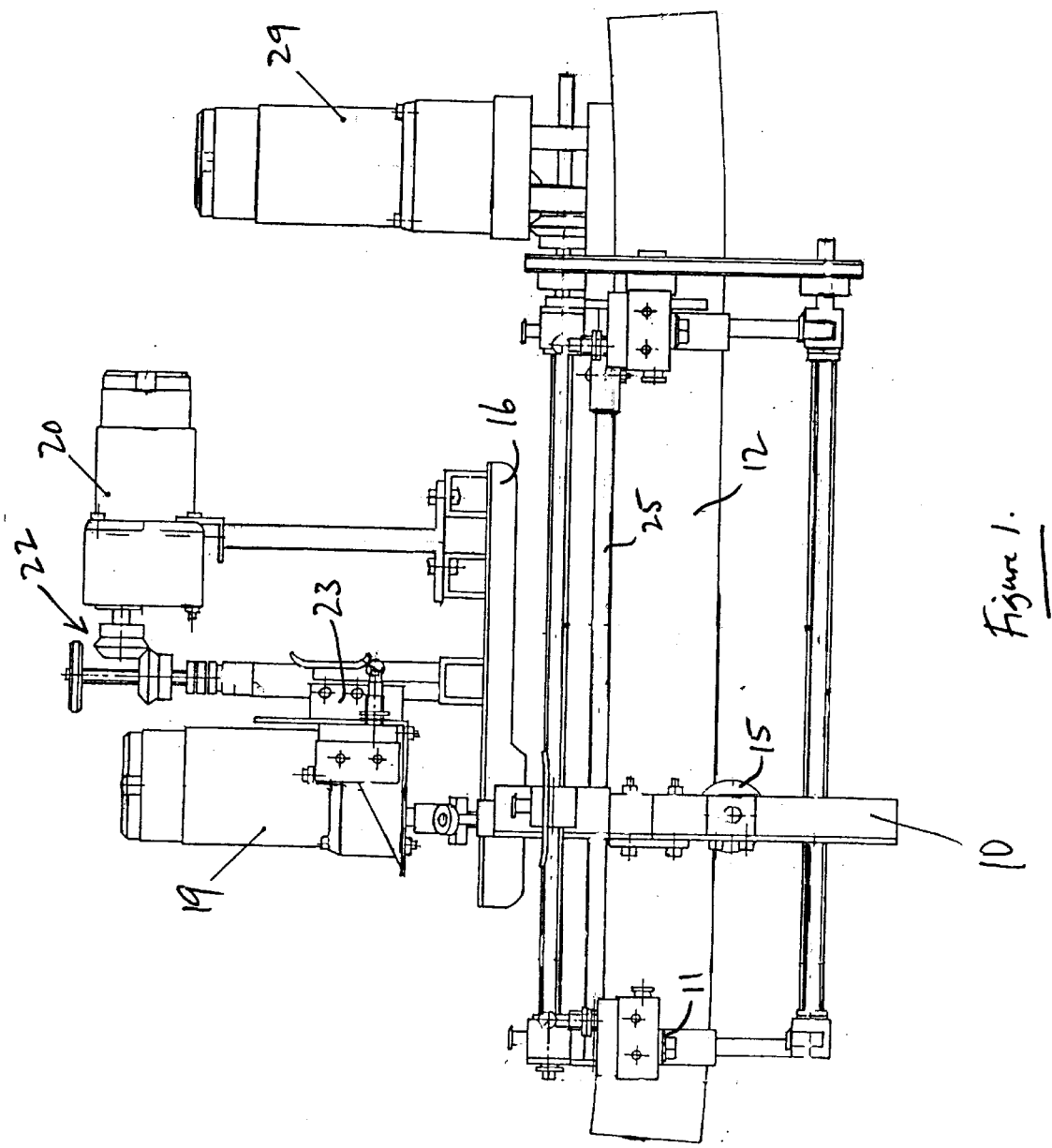
FIG. 1 is a side elevation of the cutter.
Figure 2:
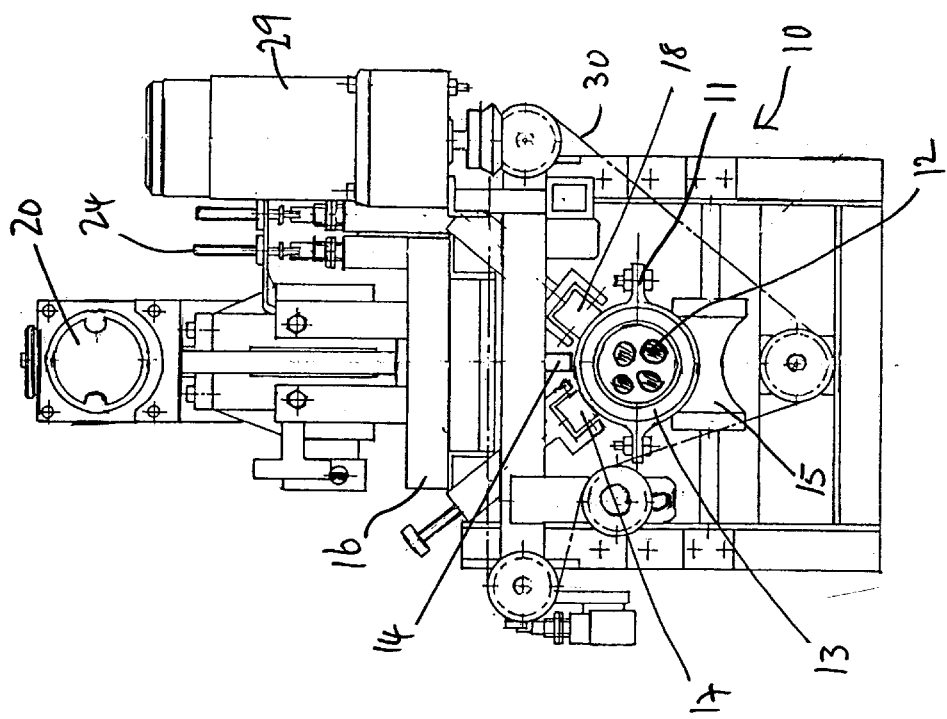
FIG. 2 is one end view of the cutter.
Figure 3:
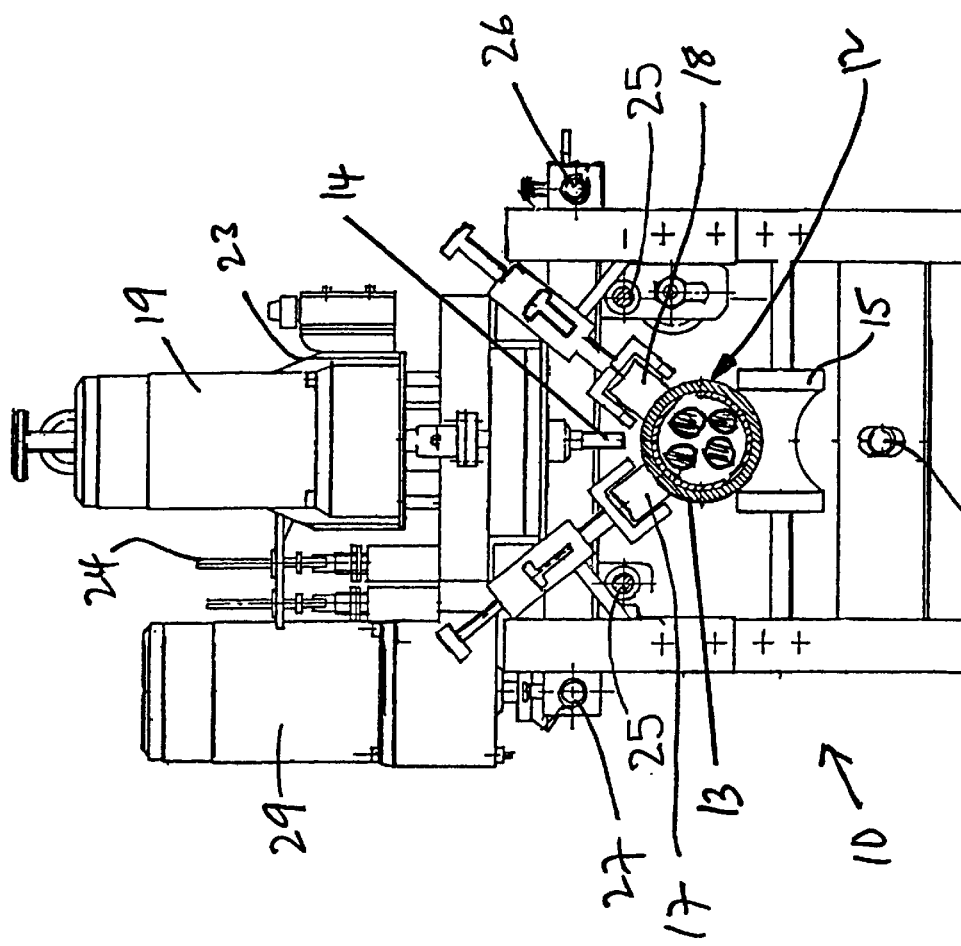
FIG. 3 is a sectional end view of another end of the cutter.

Referring to the drawings, the cutter comprises a generally rectangular box-like frame 10 formed of steel members joined together and to clamps 11 adjacent each end of the frame. The clamps enable the frame to be firmly clamped at each end to a section of a power cable 12 that extends in use through the frame 10. Importantly, the clamps 11 are arranged to be removably attached at each end of the section to hold the power cable while a metallic sheath 13 can be sliced by the cutter as required. As the power cable in effect supports the frame 10, a cutting or slicing tool 14, comprising a milling drill, can be positioned in fixed relationship with respect to an outer surface of the power cable so that a depth of cut remains the same as the cutting tool 14 is moved along the section of the power cable. This depth is further controlled automatically as required if the power cable section is not quite straight (i.e. somewhat curved) by providing a lower cable supporting concave roller 15 rotatably mounted to a carriage 16 directly opposite the cutting tool 14.

The concave surface of the roller 15 bears in intimate contact against an outer surface of the sheath 13 of the power cable 12. Two further upper rollers 17 and 18 mounted to the carriage 16 can be adjusted to press against upper surfaces of the sheath at each side of the cutting tool 14. The carriage 16 thus "floats" on the cable 12 in use so as to automatically remain in fixed relationship with the outer surface of the sheath.

The carriage 16 supports a first 12 volt direct current motor 19 directly attached to the cutting tool 14 and a second 12 volt direct current motor 20 for adjusting the position, up and down, of the motor 19. The motor 20 is arranged to drive a generally conventional gear mechanism 22 that supports a mounting plate 23 of the motor 19.

In use, the motor 20 is operated as required to move the motor 19, and hence the cutting tool 14, up and down so that when the carriage 16 moves along the section of the power cable, a remote end of the cutting tool 14 cuts into the outer surface of cable to a sufficient depth, but no more, for slicing along the outer sheath 13 and so as not contact or damage inner power cable strands or their insulation. A depth limit switch 24 is shown that can be adjusted and set to cut-out or interrupt a power supply to the motor 20 when a required cutting "depth" position of the cutting tool 14 is reached.

If necessary, for example, the cutting tool 14 can be moved down until its remote end touches the outer surface of the sheath. This can be determined by using a simple electric testing equipment, comprising an electric bulb and battery. An end of a wire is contacted against the outer sheath somewhere along and adjacent the section of the power cable, using a sharp-pointed conductive probe if necessary. The wire is connected with the battery and the bulb in series and contacted against the motor 19 (or a top end of the cutting tool 14). When the remote end of the cutting tool is driven down by the motor 20 and first touches the outer surface of the sheath, the bulb will light up. This position therefore sets the required depth required to contact the outer surface of the sheath 13. A physical adjustment is then made to the depth limit switch 24 to take account of the thickness (or effective thickness, if the sheath is in a corrugated form) of the sheath 13. Once the depth limit switch 24 is adjusted in this way, the cutting tool 14 will thereafter cut to the set relative depth (say, 0.5 mm below the lower or inner surface of the sheath 13) to safely and effectively slice along the sheath as required. The limit switch 24 will automatically prevent the cutting tool cutting to a depth beyond the set relative depth.

The carriage 16 is slidingly supported on the frame 10 on two guide rods 25. Three helical drive shafts 26, 27 and 28 are mounted to the frame. The carriage has respective helical followers that fit over the shafts 26, 27 and 28 so that when the shafts rotate, the carriage 16 is drawn along the frame 10. A 12 volt direct current motor 29 mounted to one end of the frame 10 provides a drive for a gear chain 30 that is coupled to rotate the shafts 26, 27 and 28. Thus, once the power cable has been clamped to the cutter and the depth limit switch 24 calibrated and set, the cutting tool 14 can be lowered to cut into the sheath to the required depth. Then the motor 29 is operated so that the carriage 16 is moved automatically over the section of the power cable to slice open the sheath 13. It is usual to have a is suitable end-of-traverse limit switch arranged to disengage power to the motor 29 when the carriage 16 arrives near an end of the section.

It will be appreciated that the carriage 16 may be pushed manually along the frame in order to slice the sheath 13, if preferred or necessary. In that case, the shafts 26, 27 and 28, the motor 29 and the chain 30 are clearly not required. However, in the preferred situation, the actual slicing operation is carried out automatically (i.e. without close manual supervision) so that personnel operating the cutter can remain somewhat distanced away from the cutter during slicing and out of danger. This is especially the case where the sheath 13 must be sliced without interrupting the power supply carried by the power cable.

The described cutters are generally portable, that is to say, can be lifted and moved to site, or point-of-need, comfortably by two men, for example. As all the motors are operated at low voltage, the motors can be conveniently supplied from a common battery pack or portable generator. (The motors may also have individual re-chargeable batteries, if preferred.) This is an important feature because cable repairs and/or testing are often necessary at remote or inconvenient locations.

It will be noted that power cable conventionally contains four power lines (or strands) that are insulated from one another and a common is wound around the power lines in a layer inside a corrugated aluminum sheath, acting as a common earth. The corrugated sheath is coated with black tar and encased in a thick shell of plastic. In normal use, the plastic shell and the tar are first burned off using a blowtorch. This exposes the corrugated sheath along the section that is required to be sliced open using the cutters described herein.

What is claimed is:

1. An electrical power cable sheath cutter for longitudinally slicing an outer metallic sheath of a power cable having a longitudinal axis, the cutter comprising:
    a frame having first and second ends, each of the first and second ends having a support clamp for clamping a respective end of a longitudinal section of cable,
    a carriage slidingly mounted on the frame for traveling longitudinally between the first and second ends of the frame,
    at least one roller mounted on the carriage for riding on the longitudinal section of cable to support the carriage in fixed lateral disposition relative to the longitudinal section of the cable being cut,
    a cutting tool mounted on the carriage and adjustable towards and away from the cable for cutting into an outer surface of the cable as the carriage travels from the first end of the frame to a second end of the frame, and
    a first electrical motor mounted on the carriage for moving the carriage between the first and second ends of the frame for automatically slicing the cable.

2. The electrical power cable sheath cutter according to claim 1, in which the at least one roller has a concave periphery for bearing against the outer surface of the longitudinal section of cable.

3. The electrical power cable sheath cutter according to claim 1, including three rollers evenly distributed around the longitudinal axis of the cable, one roller being positioned directly opposite the cutting tool.

4. The electrical power cable sheath cutter according to claim 1, including a second electrical motor mounted on the carriage for driving the cutting tool towards and away from the cable.

5. The electrical power cable sheath cutter according to claim 4, wherein the cutting tool is a milling drill.

6. The electrical power cable sheath cutter according to claim 4, wherein the second electrical motor is a direct current motor.

7. The electrical power cable sheath cutter according to claim 1, including a threaded feeding shaft extending between and supported by the first and second ends of the frame, an endless drive loop operatively interconnecting the first electrical motor and the threaded feeding shaft, and a threaded follower fixed to the carriage and threadedly coupled to the threaded feeding shaft for moving the carriage between the first and second ends of the frame when the first electrical motor is operated, driving the endless drive loop and thereby rotating the threaded feeding shaft.

* * * * *